United States Patent
Barari et al.

(10) Patent No.: US 10,255,502 B2
(45) Date of Patent: Apr. 9, 2019

(54) METHOD AND A SYSTEM FOR GENERATING A CONTEXTUAL SUMMARY OF MULTIMEDIA CONTENT

(71) Applicant: WIPRO LIMITED, Bangalore (IN)

(72) Inventors: Adrita Barari, Kolkata (IN); Manjunath Ramachandra, Bangalore (IN); Ghulam Mohiuddin Khan, Bangalore (IN)

(73) Assignee: Wipro Limited, Bangalore (IN)

(*) Notice: Subject to any disclaimer, the term of this patent is extended or adjusted under 35 U.S.C. 154(b) by 20 days.

(21) Appl. No.: 15/638,404

(22) Filed: Jun. 30, 2017

(65) Prior Publication Data
US 2018/0336417 A1 Nov. 22, 2018

(30) Foreign Application Priority Data
May 18, 2017 (IN) .............................. 201741017535

(51) Int. Cl.
G06K 9/00 (2006.01)
G06F 17/24 (2006.01)

(52) U.S. Cl.
CPC ....... *G06K 9/00684* (2013.01); *G06F 17/241* (2013.01); *G06K 9/00744* (2013.01); *G06K 9/00751* (2013.01)

(58) Field of Classification Search
CPC ......... H04L 51/02; H04L 51/04; H04L 51/26; H04L 65/604; H04L 65/4076; H04W 4/14; C06F 3/0482; G06F 17/30398; G06F 17/30029; G06F 17/30058; G06K 9/00684; G06K 9/00744
See application file for complete search history.

(56) References Cited

U.S. PATENT DOCUMENTS

| 8,650,094 B2* | 2/2014 | Cai ..................... G06Q 10/06 705/26.7 |
| 2009/0041356 A1 | 2/2009 | Barbieri et al. |
| 2013/0095864 A1* | 4/2013 | Marovets ............... H04W 4/14 455/466 |
| 2014/0156645 A1* | 6/2014 | Brust ............... G06F 17/30554 707/722 |

(Continued)

OTHER PUBLICATIONS

Wang, S., et al., "Video affective content analysis: a survey of state-of-the-art methods", *IEEE Transaction on Affective Computing*, 2015, 20 pages.

*Primary Examiner* — Amir Alavi
(74) *Attorney, Agent, or Firm* — Finnegan, Henderson, Farabow, Garrett & Dunner LLP

(57) ABSTRACT

A testing device for performing testing across a plurality of smart devices is disclosed. The testing device may be configured to register the plurality of smart devices to be accessed for performing testing. At least one time-window at which each smart device is idle may be determined, by the testing device, for the plurality of smart devices. Upon gathering the testing criteria and time duration for performing a testing operation, the testing device may be configured to dynamically create a test group that includes one or more smart devices from the plurality of smart devices such that the one or more smart devices in the test group satisfy the testing criteria and the at least one time-window of smart devices in the test group is within the time duration.

20 Claims, 4 Drawing Sheets

(56) References Cited

U.S. PATENT DOCUMENTS

| | | | |
|---|---|---|---|
| 2015/0178388 A1* | 6/2015 | Winnemoeller | G06F 17/30864 707/722 |
| 2016/0014482 A1 | 1/2016 | Chen et al. | |
| 2016/0224834 A1 | 8/2016 | Adsumilli et al. | |
| 2016/0267071 A1* | 9/2016 | Castelli | H04L 67/10 |
| 2016/0315990 A1* | 10/2016 | Naidu | H04L 65/604 |
| 2017/0171117 A1* | 6/2017 | Carr | H04L 51/02 |
| 2017/0358035 A1* | 12/2017 | Benfield | G06F 17/30023 |
| 2018/0025050 A1* | 1/2018 | Yadav | G06F 17/30398 |

* cited by examiner

METHOD AND A SYSTEM FOR GENERATING A CONTEXTUAL SUMMARY OF MULTIMEDIA CONTENT

TECHNICAL FIELD

The present subject matter relates generally to paraphrasing multimedia content, and more particularly, but not exclusively to a method and a system for generating a contextual summary of multimedia content.

BACKGROUND

Nowadays, multimedia content is available in abundance. The multimedia content may include, video footage, images, audio recording and the like. Most of the multimedia content is used for purposes like education, surveillance, security systems, medical investigations and the like. Generally, the video footage includes more information than an image or an audio content. Therefore, retrieving sensible information from the video footage and effective utilization of information in the video footage is of utmost importance. Some video footages are extremely long and may include a lot of redundant information. Analyzing such long video footages including redundant information may be a tiring process and consumes a lot of time and effort of people. Further, since the video footage consists of both audio data and visual data, analyzing both these contents is important. However, the existing systems utilize only visual descriptors of the video footage for obtaining the sensible information and audio descriptors of the video footage are ignored.

Few of the existing techniques consider the video descriptors and audio descriptors for extracting the sensible information from the video footage. However, even if the audio descriptors are considered, there is a high chance that a correct overview of the video footage may not be captured in the extracted sensible information or summary since direct translation of the audio from the video footage may not identify context of the video footage. Further, some other existing techniques disclose summary generation based on motion detected in the video footage. Events of interest within the video footage are identified based on the corresponding metadata, and best scenes are identified based on the identified events of interest. Motion values may be determined for each frame and portions of the video footage including frames with the most motion that are identified as best scenes. A video summary can be generated including one or more of the identified best scenes. However, the summary generated using this technique may lead to gaps in understanding due to missing continuity between each scene of the video footage and context of the events. The missing continuity may occur since only the best scenes are considered for generating the video summary. The missing context may occur since the mood of the video is not considered. Further, the best scenes may include the redundant information of the video footage which is not eliminated.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a contextual summary of multimedia content. The method comprising retrieving, by a contextual summary generator, the multimedia content comprising one or more scenes from a multimedia content database. The contextual summary generator generates one or more scene descriptors, describing a scene, for each of the one or more scenes. Further, the contextual summary generator identifies an emotion factor in each of the one or more scenes based on each of the one or more scene descriptors, each of one or more speech descriptors and each of one or more textual descriptors associated with each of the one or more scenes. Upon identifying the emotion factor, the contextual summary generator, generates a context descriptor, indicating context of each of the one or more scenes, for each of the one or more scenes based on analysis of each emotion factor in each of the one or more scenes and non-speech descriptors associated with each of the one or more scenes. Finally, the contextual summary generator correlates one or more scene descriptors, one or more textual descriptors, and context descriptors of the one or more scenes based on a dynamically configured threshold value to generate the contextual summary of the multimedia content.

Further, the present disclosure includes a contextual summary generator for generating a contextual summary of multimedia content. The contextual summary generator comprises a processor and a memory communicatively coupled to the processor. The memory stores the processor-executable instructions, which, on execution, causes the processor to retrieve the multimedia content comprising one or more scenes from a multimedia content database. Further, the processor generates one or more scene descriptors, describing a scene, for each of the one or more scenes. Furthermore, the processor identifies an emotion factor in each of the one or more scenes based on each of the one or more scene descriptors, each of one or more speech descriptors and each of one or more textual descriptors associated with each of the one or more scenes. Upon identifying the emotion factor, the processor generates a context descriptor, indicating context of each of the one or more scenes, for each of the one or more scenes based on analysis of each emotion factor in each of the one or more scenes and non-speech descriptors associated with each of the one or more scenes. Finally, the processor correlates one or more scene descriptors, one or more textual descriptors, and context descriptors of the one or more scenes based on a dynamically configured threshold value to generate the contextual summary of the multimedia content.

Furthermore, the present disclosure includes a non-transitory computer readable medium including instructions stored thereon that when processed by at least one processor causes a contextual summary generator to perform operations comprising retrieving the multimedia content comprising one or more scenes from a multimedia content database. Upon retrieving the multimedia content, the instructions cause the processor to generate one or more scene descriptors, describing a scene, for each of the one or more scenes. Further, the instructions cause the processor to identify an emotion factor in each of the one or more scenes based on each of the one or more scene descriptors, each of one or more speech descriptors and each of one or more textual descriptors associated with each of the one or more scenes. Upon identifying the emotion factor, the instructions cause the processor to generate a context descriptor, indicating context of each of the one or more scenes, for each of the one or more scenes based on analysis of each emotion factor in each of the one or more scenes and non-speech descriptors associated with each of the one or more scenes. Finally, the instructions cause the processor to correlate the one or more scene descriptors, the one or more textual descriptors, and the context descriptors of the one or more scenes based on a dynamically configured threshold value to generate the contextual summary of the multimedia content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
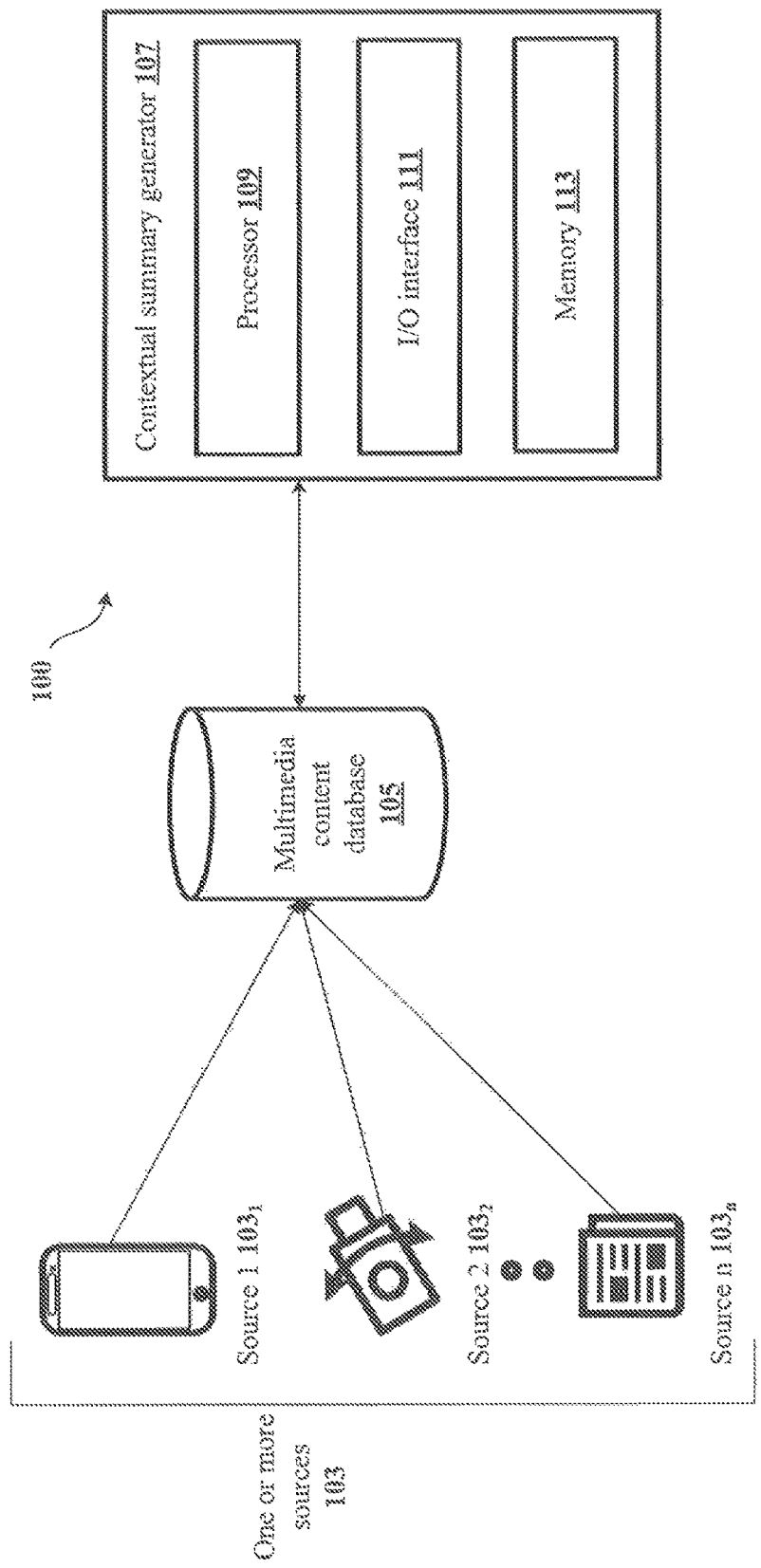
FIG. 1 shows an exemplary architecture for generating a contextual summary of multimedia content in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a contextual summary generator (alternatively also referred as "system") for generating a contextual summary of multimedia content. The contextual summary generator may be implemented as a server or as any other computing device. The contextual summary generator retrieves the multimedia content comprising one or more scenes from a multimedia content database. The multimedia content database is associated with the contextual summary generator. Further, the contextual summary generator generates one or more scene descriptors for each of the one or more scenes. The one or more scene descriptors describe the scene of the multimedia content. As an example, if the scene is a football match, the one or more scene descriptors may be "stadium", "audience", "football", "players", "referee" and the like. Further, the present disclosure provides a feature wherein the contextual summary is generated by considering factors such as mood, emotion and context of scenes in the multimedia content. The contextual summary generator identifies an emotion factor in each of the one or more scenes based on each of the one or more scene descriptors, each of one or more speech descriptors and each of one or more textual descriptors associated with each of the one or more scenes. Upon identifying the emotion factor, the contextual summary generator, generates a context descriptor, indicating context of each of the one or more scenes, for each of the one or more scenes based on analysis of each emotion factor in each of the one or more scenes and non-speech descriptors associated with each of the one or more scenes. Finally, the contextual summary generator correlates the one or more scene descriptors, the one or more textual descriptors, and the context descriptors of the one or more scenes based on a dynamically configured threshold value to generate the contextual summary of the multimedia content. As an example, the dynamic threshold value may be a time constraint. As an example, if the time constraint is dynamically set as 5 minutes, the system automatically correlates information related to the scene in various combinations of the format to generate the contextual summary with proper flow that does not exceed 5 minutes. Also, the present disclosure maintains continuity in the contextual summary such that meaning/story of the scene being summarized is captured in a proper flow. Summarizing the content along with the mood, emotion, context and also maintaining continuity, instead of watching or hearing the entire multimedia content that may be redundant saves a lot of precious time and effort of the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a contextual summary of multimedia content in accordance with some embodiments of the present disclosure.

The architecture 100 includes one or more sources, source 1 $103_1$ to source n $103_n$ (collectively referred to as one or more sources 103), a multimedia content database 105 and a contextual summary generator 107. As an example, the one or more sources 103 may be capable of capturing multimedia content comprising one or more scenes. As an example, the one or more scenes may be any real world actions such as kids running, players playing a game of football in a stadium, vehicles moving on a road, a burglary and the like. The one or more scenes may be captured in real-time by the one or more sources 103 in at least one of a video format, an audio format, an image format and a textual format. As an example, the one or more sources 103 may be an image capturing device, an audio recorder, documents and the like. As an example, the image capturing devices may be a camera, a mobile phone and the like. As an example, the audio recorder may be a mobile phone installed with an audio recording application, a dictaphone and the like. As an example, the documents may include written text/printed text/a sketch and the like that may capture the description of the one or more scenes based on a narration by a spectator. The one or more sources 103 may be associated with the multimedia content database 105. The one or more sources 103 may transmit the multimedia content including the one or more scenes to the multimedia content database 105 through a communication network (not shown in the FIG. 1). The communication network may be at least one of a wired communication network or a wireless communication network. In some embodiments, the multimedia content database 105 may be present within the contextual summary generator 107. In some embodiments, the multimedia content 105 may be externally associated with the contextual summary generator 107. The one or more sources 103 may transmit the multimedia content to a multimedia content database 105 for storage in at least one of the video format, the audio format, the image format and the textual format.

The contextual summary generator 107 comprises a processor 109, an Input/Output (I/O) interface 111 and a memory 113. The I/O interface 111 may retrieve a desired multimedia content including the one or more scenes from the multimedia content database 105. The retrieved multimedia content is provided to the processor 109. The processor 109 may generate one or more scene descriptors of each of the one or more scenes in the multimedia content. The one or more scene descriptors describe the scene. As an example, if the scene is a football match, the one or more scene descriptors may be "stadium", "audience", "football", "players", "referee" and the like. Further, the processor 109 may identify an emotion factor in each of the one or more scenes based on each of the one or more scene descriptors, each of one or more speech descriptors and each of one or more textual descriptors associated with each of the one or more scenes. In some embodiments, the emotion factor may describe an emotion involved in the scene. As an example, if the scene is related to an accident, the emotion factor may be sad, tensed, unhappy, undesirable and the like.

In some embodiments, the processor 109 may obtain the one or more speech descriptors, one or more non-speech descriptors and the one or more textual descriptors based on an audio content in the one or more scenes. The audio content may further include speech audio signals and non-speech audio signals. As an example, the speech audio signals may be a man talking, a kid singing and the like. The processor 109 may obtain the one or more speech descriptors from the speech audio signals. As an example, the one or more speech descriptors include information related to at least one of pitch, tone or speed of the speech audio signals present in each of the one or more scenes. As an example, the non-speech audio signals may be a dog barking, noise of a car racing, a bell ringing and the like. The processor 109 may obtain the one or more non-speech descriptors from the non-speech audio signals. Further, the processor 109 may convert the one or more speech audio signals into a text format. The processor 109 may use the text format of the one or more speech audio signals to obtain the one or more textual descriptors of the multimedia content.

Further, the processor 109 may generate a context descriptor for each of the one or more scenes. In some embodiments, the context descriptor may indicate context of each of the one or more scenes. As an example, the context descriptor for each of the one or more scenes may describe, but not limited to, a formal context, an informal context, a humorous context, a serious context, a positive context, a negative context and an emergency context. The processor 109 may perform an analysis of each emotion factor in each of the one or more scenes and the non-speech descriptors associated with each of the one or more scenes to generate the context descriptor. Upon generating the context descriptor for each of the one or more scenes, the processor 109 may correlate the one or more scene descriptors, one or more textual descriptors, and context descriptors of the one or more scenes based on a dynamically configured threshold value to generate a contextual summary of the multimedia content. In some embodiments, the processor 109 may select the one or more scenes for correlating based on a rank assigned to each of the one or more scenes. As an example, the rank may be at least one of a high rank and a low rank. In some embodiments, the dynamically configured threshold value may be based on time for which the contextual summary of the multimedia content should be generated. In some embodiments, the dynamically configured threshold value may be based on information to be present in the contextual summary of the multimedia content. The information indicates the one or more scene descriptors, the one or more speech descriptors, the one or more non-speech descriptors, the one or more textual descriptors and the one or more context descriptors. The information and the contextual summary may be stored in the memory 113.

Figure 2:
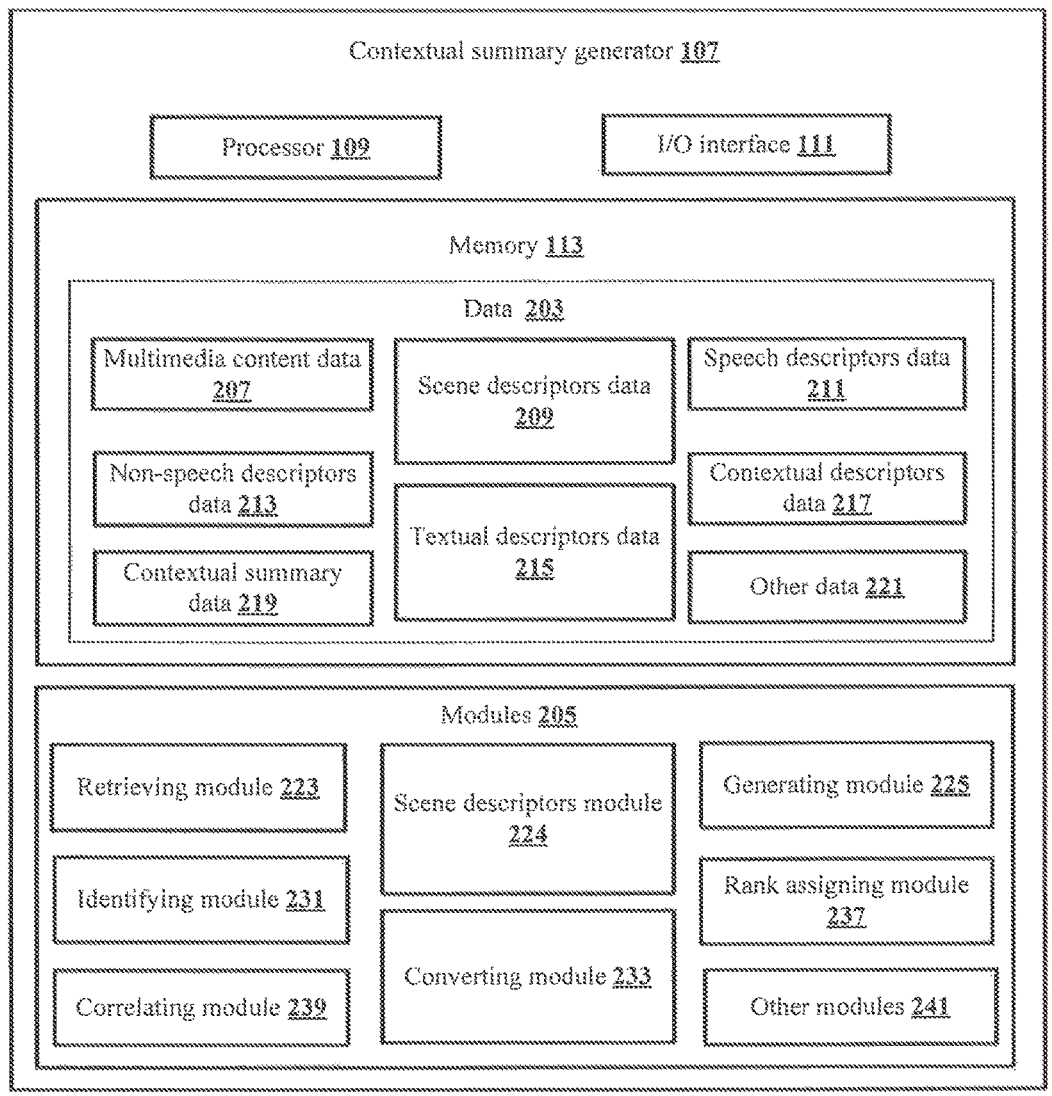
FIG. 2 shows a detailed block diagram of a contextual summary generator for generating a contextual summary of multimedia content in accordance with some embodiments of the present disclosure.

FIG. 2 shows a detailed block diagram of the contextual summary generator for generating a contextual summary of multimedia content in accordance with some embodiments of the present disclosure.

In some implementations, the contextual summary generator 107 may include data 203 and modules 205. As an example, the data 203 is stored in the memory 113 configured in the contextual summary generator 107 as shown in the FIG. 2. In one embodiment, the data 203 may include multimedia content data 207, scene descriptors data 209, speech descriptors data 211, non-speech descriptors data 213, textual descriptors data 215, context descriptors data 217, contextual summary data 219 and other data 221. In the illustrated FIG. 2, modules 205 are described herein in detail.

In some embodiments, the data 203 may be stored in the memory 113 in form of various data structures. Additionally, the data 203 can be organized using data models, such as relational or hierarchical data models. The other data 221 may store data, including temporary data and temporary files, generated by the modules 205 for performing the various functions of the contextual summary generator 107.

In some embodiments, the data 203 stored in the memory 113 may be processed by the modules 205 of the contextual summary generator 107. The modules 205 may be stored within the memory 113. In an example, the modules 205 communicatively coupled to a processor 109 configured in the contextual summary generator 107, may also be present outside the memory 113 as shown in FIG. 2 and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a retrieving module 223, a scene descriptors module 224, a generating module 225, an identifying module 231, a converting module 233, a rank assigning module 237, a correlating module 239 and other modules 241. The other modules 241 may be used to perform various miscellaneous functionalities of the contextual summary generator 107. It will be appreciated that such aforementioned modules 205 may be represented as a single module or a combination of different modules.

In some embodiments, the retrieving module 223 may retrieve a multimedia content from a multimedia content database 105 associated with the contextual summary generator 107. The multimedia content may include one or more scenes. The retrieved multimedia content may be stored as the multimedia content data 207.

In some embodiments, the scene descriptors module 224 may generate one or more scene descriptors for each of the one or more scenes in the multimedia content. In some embodiments, the one or more scene descriptors describe the scene. The one or more scene descriptors may be stored as scene descriptors data 209. As an example, if the scene is related to kids playing in a park, the one or more scene descriptors may be "lawn", "swing", "kids", "see-saw", "slide", "parents" and the like.

In some embodiments, the scene descriptors module 224 may determine one or more key frames from each of the one or more scenes. The one or more key frames may be determined using one or more predefined techniques. Further, the scene descriptors module 224 may determine distance between each of the one or more key frames. The distance between each of the one or more key frames may provide an insight on redundant actions in the consecutive key frames. In some embodiments, the distance between each of the one or more key frames may be determined based on objects in the key frames, actions performed by the objects in the key frame, time for which the objects are present in the key frame and the like. As an example, the objects may be any living and non-living things present in each of the one or more scenes. The scene descriptors module 224 may determine the distance between two consecutive key frames using, but not limited to, a technique known as Kullback divergence technique. Upon determining the distance between the one or more consecutive key frames, the distance may be compared with a predetermined distance threshold value. If the distance between the consecutive key frames is less than the predetermined distance threshold value, the scene descriptors module 224 may determine that the two consecutive key frames are redundant and thus discard one of the two consecutive key frames.

As an example, consider 4 key frames "A", "B", "C" and "D". The scene descriptors module 224 may determine distance between the key frames "A" and "B", and then "C" and "D". Based on the determined distance, if "B" is considered to be close to "A" than "C" is to "D", then the key frame "B" is considered to be redundant with the key frame "A" and thus discarded. On the other hand, if "C" is considered to be close to "D" than "B" is to "A", then the key frame "C" is considered to be redundant with the key frame "D" and thus discarded. In some embodiments, when the one or more redundant key frames are discarded, continuity between the scenes may be missing. Therefore, though the one or more redundant key frames are discarded, the content of the one or more redundant key frames that are discarded may be summarized using one or more predefined summarizing techniques and stored in the memory 113. As an example, summary of the one or more key frames that are discarded may be stored in a text format or an audio format.

Further, the scene descriptors module 224 may obtain the one or more non-redundant key frames from the one or more key frames based on the distance between each of the one or more consecutive key frames. Upon obtaining the one or more non-redundant key frames, the scene descriptors module 224 may identify one or more objects, one or more actions related to the objects and background where the one or more objects in each of the one or more non-redundant key frames are present. In some embodiments, the scene descriptors module 224 may use one or more pre-existing computer vision techniques and deep learning techniques to identify the one or more objects, the one or more actions related to the objects and the background where the one or more objects are present. Based on the identified aspects, the scene descriptors module 224 may generate the one or more scene descriptors related to each of the one or more scenes. In some embodiments, when the generated one or more scene descriptors of the consecutive non-redundant key frames provide same description, one of the consecutive non-redundant key frames may be discarded. A summary of the discarded non-redundant key frame may be stored in the memory 113.

Further, the generating module 225 may generate one or more speech descriptors, one or more non-speech descriptors and one or more textual descriptors using audio content of each of the one or more non-redundant key frames belonging to each of the one or more scenes. In some embodiments, the audio content may include speech audio signals and non-speech audio signals. As an example, the speech audio signals may be a man talking, a kid singing and the like. The generating module 225 may generate the one or more speech descriptors from the speech audio signals. As an example, the one or more speech descriptors include information related to at least one of pitch, tone or speed of the speech audio signals present in each of the one or more non-redundant key frames belonging to each of the one or more scenes. The one or more speech descriptors may be stored as the speech descriptors data 211. As an example, the non-speech audio signals may be a dog barking, noise of a car racing, a bell ringing and the like. The generating module 225 may generate the one or more non-speech descriptors from the non-speech audio signals. The one or more non-speech descriptors may be stored as the non-speech descriptors data 213.

In some embodiments, the converting module 233 may convert the one or more speech audio signals into a text format. The generating module 225 may use the text format of the one or more speech audio signals to generate the one or more textual descriptors. The one or more textual descriptors may be stored as the textual descriptors data 215.

As an example, consider a scene in which a football player is kicking a football. The audio content in the background of the scene may be commentary and audience cheering. In this example, the commentary is a speech audio signal and audience cheering is a non-speech audio signal. The commentary may be "Audio: football player kicking the football with full force". The one or more speech descriptors may be generated that indicate the pitch, tone or speed of the speech audio signals. Further, the converting module 233 may convert the commentary into the text format "Text: football player kicking the football with full force" to generate the one or more textual descriptors such as "commentary", "player kicking the football" and the like. As an example, the audience cheering is a non-speech audio signal that may be used to generate the one or more non-speech descriptors.

In some embodiments, the identifying module 231 may identify an emotion factor in each of the one or more scenes based on each of the one or more scene descriptors, each of the one or more speech descriptors and each of the one or more textual descriptors associated with each of the one or more scenes. An emotion factor may describe an emotion involved in each of the one or more scenes. As an example, if the scene is related to an accident, the emotion factor may be sad, tensed, unhappy, undesirable and the like.

Upon identifying the emotion factor in each of the one or more scenes, in some embodiments, the generating module 225 may generate a context descriptor for each of the one or more scenes. The context descriptor may indicate context of each of the one or more scenes. In some embodiments, the generating module 225 may generate the context descriptor based on analysis of each emotion factor in each of the one or more scenes. The context descriptor for each of the one or more scenes may be stored as the context descriptors data 217. Each emotion factor in each of the one or more scenes and each non-speech descriptors associated with each of the one or more scenes may be analysed to provide an analysis result based on which the context descriptor of each of the one or more scenes may be generated.

In some embodiments, the rank assigning module 237 may assign a rank to each of the one or more scenes based on each of the one or more or more scene descriptors, the context descriptors and a dynamically generated weightage corresponding to each of the one or more scenes. In some embodiments, the dynamically generated weightage is computed based on frequency and duration of occurrence of the objects in each of the one or more scenes.

As an example, the rank may be either a high rank or a low rank. The rank assigning module 237 may assign the high rank to the one or more scenes when the corresponding one or more scene descriptors contribute significantly in analyzing the context and maintaining continuity of a contextual summary of the multimedia content. The one or more scenes are assigned with the low rank when the one or more scene descriptors of each of the one or more corresponding scenes are not proximal to one or more consecutive scenes. As an example, in the multimedia content of duration 2 hours, if a person appears in one of the scene just once and says "I'm fine" and does not appear further in any of the consecutive scenes, this part may be considered as not proximal to the one or more consecutive scenes.

In some embodiments, the correlating module 239 may correlate the one or more scene descriptors, the one or more textual descriptors, and the context descriptors of the one or more scenes based on a dynamically configured threshold value to generate the contextual summary of the multimedia content. In some embodiments, the dynamically configured threshold value is based on at least one of time for which the contextual summary of the multimedia content should be generated and information to be present in the contextual summary of the multimedia content. In some embodiments, the information indicates the one or more scene descriptors, the one or more speech descriptors, the one or more non-speech descriptors, the one or more textual descriptors and the one or more context descriptors. Based on the dynamically configured threshold value, the correlating module 239 may correlate the information related to the one or more scenes automatically. The correlating module 239 may select the one or more scenes for correlating based on the rank assigned to each of the one or more scenes. In some embodiments, the high rank scenes are given priority over the low rank scenes. However, if the low rank scenes are important for maintaining continuity in the scenes, the priority may be overlooked. Further, the correlating module 239 may incorporate the summary of the discarded key frames if necessary, to maintain continuity in the contextual summary. Based on the correlated scenes, the generating module 225 may generate the contextual summary for the multimedia content. The contextual summary may be stored as the contextual summary data 219. In some embodiments, the contextual summary may be in at least one of an audio format, a video format, an image format and or a textual format. In some embodiments, the contextual summary may be a combination of the above mentioned formats. The correlating module 239 may decide the format based on the dynamically generated threshold value. As an example, consider the multimedia content is a video of 20 minutes comprising 10 different scenes. If the dynamically configured threshold value is a time constraint and the time constraint is dynamically set as 2 minutes. The correlation module 239 automatically correlates information related to the scene in any format combinations to generate the contextual summary with proper flow that does not exceed 2 minutes.

The contextual summary generated includes not just the summary of the multimedia content but also the emotion of the scene, context of the scene and continuity between the scenes. Further, the contextual summary may not involve any redundant data. As an example, consider a scene which includes a video of a cricket player hitting a cricket ball and the scene also includes a background commentary that narrates action of the cricket player. If the video or the audio alone can sufficiently explain the action, the correlating module 239 may correlate the information related to the scene in such a way that, the contextual summary related to that scene includes either the audio or video alone, thereby eliminating redundancy.

Consider an exemplary scenario where highlights of a football match are displayed. The football match is captured in a video along with the audio. Therefore, the multimedia content in the exemplary scenario is the video of the highlights of the football match assisted with the audio for a duration of 5 minutes.

Further, consider that the multimedia content includes 4 scenes. The information related to each of the 4 scenes is given below.

Scene 1:
Video: shows a football match in which a player "X" passes a football to player "Y".
Audio: It is a beautiful pass by Player "X" to player "Y".
Scene descriptors for scene 1: football, player "X" passing, player "Y" awaiting, stadium, crowd tensed, other players around player "X" and player "Y".

Emotion factor for scene 1:
Excited: 0.6
Tension: 0.3
Informal: 0.05
Happy: 0.05
Context Descriptor of scene 1: Positive, excited, tensed
Scene 2:
Video: Player "Y" kicks the football towards goalpost
Audio: And it is player "Y" kicking the football
Scene descriptors for scene 2: football, player "Y" hitting, stadium, goal post, crowd tensed, other players around player "Y".
Emotion factor of scene 2:
Excited: 0.6
Tension: 0.3
Happy: 0.1
Context Descriptor: Positive, Excited, Tensed
Scene 3:
Video: player "Y" scores a goal
Audio: It's a GOAL!
Scene descriptors for scene 3: football, player "Y" scored a goal, stadium, goal post, goal, crowd cheering, opponent players sad and tensed, player "Y" shouting, happy.
Emotion factor of scene 3:
Excited: 0.2
Celebration: 0.6
Happy: 0.2
Context Descriptor: Positive, Celebration, Excited, Happy
Scene 4:
Video: Player "Y" waves his jersey to the crowd. crowd is shouting.
Audio: None
Scene descriptors for scene 4: jersey, player "Y" waving jersey, stadium, crowd shouting, player "Y" emotional, happy.
Emotion factor of scene 4:
Emotional: 0.4
Celebration: 0.4
Happy: 0.2
Context Descriptor: Positive, Emotional, Celebration, Happy Consider the dynamically generated threshold value is a time constraint of 35 seconds. The correlating module 239 may automatically correlate the information/scenes such that contextual summary does not exceed 35 seconds.

An exemplary contextual summary is as shown below.

In this exemplary video, player "X" beautifully passes the football to Player "Y" [is represented in the form of a video]. Player "Y" kicks towards the goalpost and scores a GOAL! [is represented in the form of a video]. An emotional player "Y" celebrates by waving his jersey to the crowd [is represented in the form of a video]. crowd shouting with happiness [is represent in the form of an audio.

Figure 3:
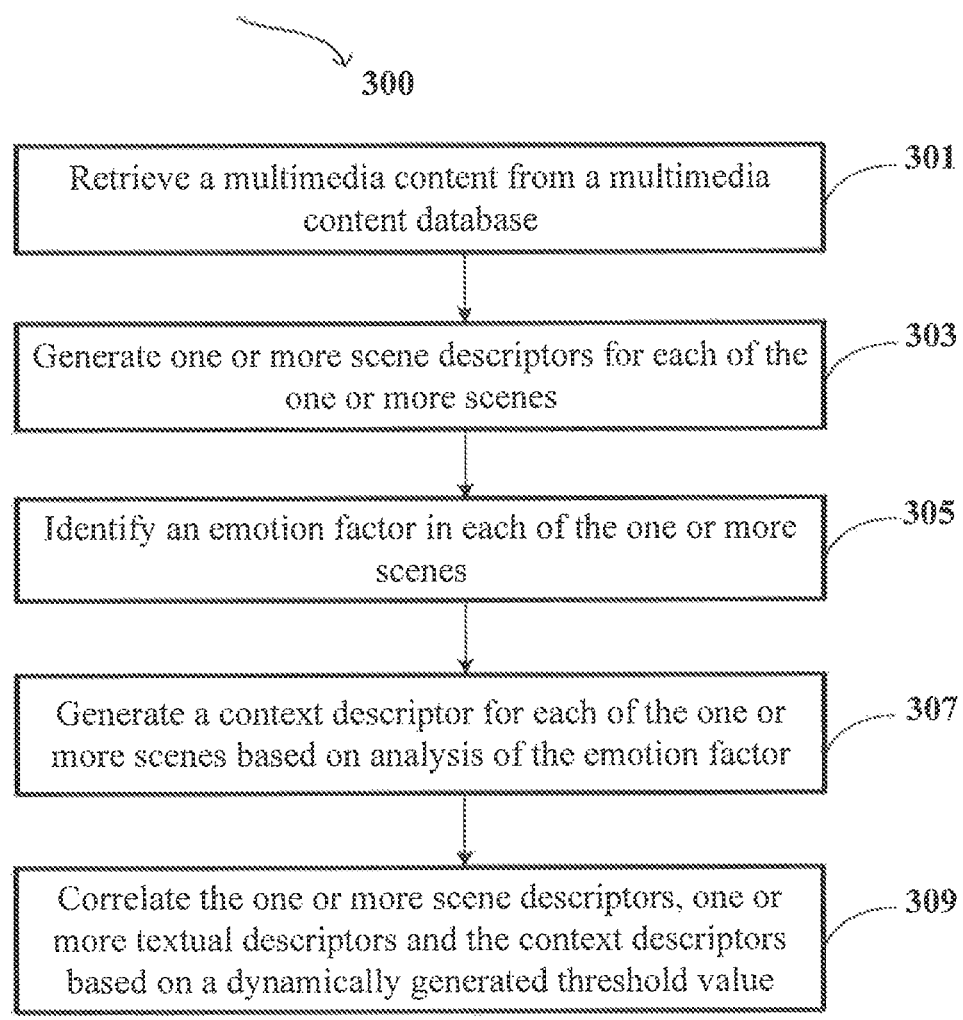
FIG. 3 shows a flowchart illustrating a method of generating a contextual summary of multimedia content in accordance with some embodiments of the present disclosure.

FIG. 3 shows a flowchart illustrating a method of generating a contextual summary of multimedia content in accordance with some embodiments of the present disclosure.

As illustrated in FIG. 3, the method 300 includes one or more blocks illustrating a method of generating a contextual summary of multimedia content. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include retrieving, by a processor 109 of the contextual summary generator 107, a multimedia content including one or more scenes from a multimedia content database 105 associated with a contextual summary generator 107.

At block 303, the method 300 may include generating, by the processor 109, one or more scene descriptors for each of the one or more scenes. In some embodiments, the one or more scene descriptors may describe the scene. In some embodiments, the processor 109 may determine one or more key frames from each of the one or more scenes using one or more predefined techniques. Further, the processor 109 may obtain one or more non-redundant key frames from the one or more key frames based on distance between each of the one or more key frames. Furthermore, the processor 109 may generate the one or more scene descriptors by identifying one or more objects, one or more actions related to the objects and background where the one or more objects are present in each of the one or more non-redundant key frames.

At block 305, the method 300 may include, identifying, by the processor 109, an emotion factor in each of the one or more scenes based on each of the one or more scene descriptors, each of one or more speech descriptors and each of one or more textual descriptors associated with each of the one or more scenes. The processor 109 may obtain each of the one or more speech descriptors from speech audio signals of an audio content present in each of the one or more scenes. Further, the processor 109 may obtain the one or more textual descriptors by converting the speech audio signals to a text format.

At block 307, the method 300 may include, generating, by the processor 109, a context descriptor for each of the one or more scenes based on analysis of each emotion factor in each of the one or more scenes and non-speech descriptors associated with each of the one or more scenes. In some embodiments, the context descriptor may indicate context of each of the one or more scenes. In some embodiments, the processor 109 may obtain one or more non-speech descriptors from non-speech audio signals of the audio content present in each of the one or more scenes.

At block 309, the method 300 may include, correlating the one or more scene descriptors, the one or more textual descriptors, and the context descriptors of the one or more scenes based on a dynamically configured threshold value. The dynamically configured threshold value may be based on at least one of time for which a contextual summary of the multimedia content should be generated and information to be present in the contextual summary of the multimedia content. In some embodiments, the information indicates the one or more scene descriptors, the one or more speech descriptors, the one or more non-speech descriptors, the one or more textual descriptors and the one or more context descriptors. Prior to correlating the one or more scenes, the processor 109 may assign at least one of a high rank and a low rank to each of the one or more scenes. Based on the rank, the processor 109 may select the one or more scenes for correlating in accordance with the dynamically generated threshold value. Finally, the processor 109 may generate the contextual summary of the multimedia content based on the correlation of the one or more scenes. In some embodiments, the contextual summary is in at least one of an audio format, a video format, an image format and or a textual format. In some embodiments, the contextual summary may be a combination of the one or more above mentioned formats.

Figure 4:
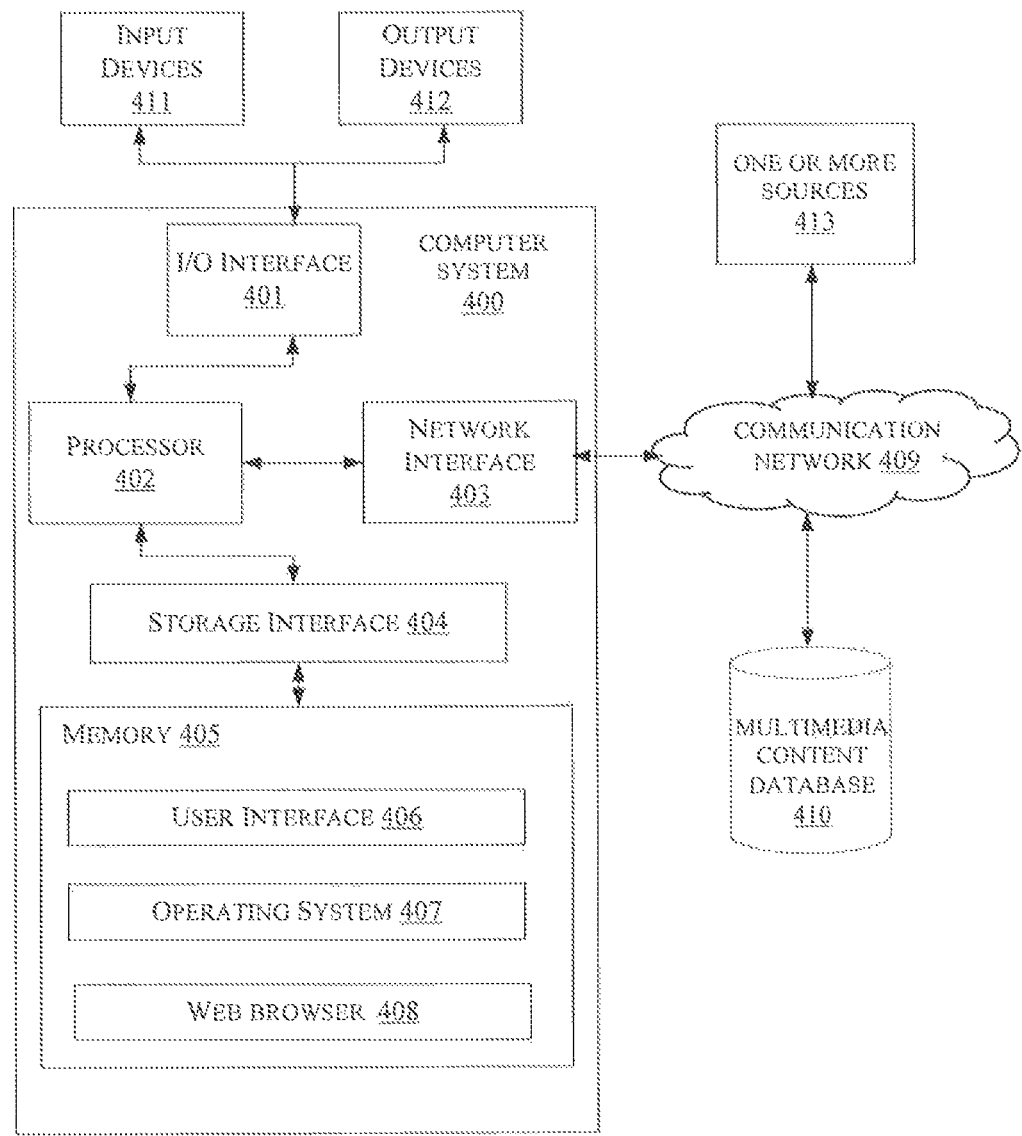
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, FIG. 4 illustrates a block diagram of an exemplary computer system 400 for implementing embodiments consistent with the present invention. In an embodiment, the computer system 400 can be contextual summary generator 107 that is used generating a contextual summary of multimedia content. The computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a multimedia content database 410 which in turn communicates with one or more sources 413 ($413_a$ up to $413_n$). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sources 413 may include, but not limited to, an image capturing device such as a camera, a mobile, a table and the like, an audio recorder such as a dictaphone, a mobile and the like, and documents. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and a system for generating a contextual summary of multimedia content.

The present disclosure provides a feature wherein the contextual summary is generated by considering factors such as mood, emotion and context of the scene.

The present disclosure provides a feature wherein contextual continuity is maintained in the contextual summary such that meaning/story of the scene being summarized is captured in a proper flow.

The present disclosure provides a feature wherein the contextual summary can be generated based on the time constraint. As an example, if the time constraint is dynamically set as 5 minutes, the system automatically correlates information related to the scene in various combinations of the format to generate the contextual summary with proper flow that does not exceed 5 minutes.

The present disclosure saves precious time and efforts of the user by summarizing the content along with the mood, emotion, context and also maintaining continuity, instead of watching or hearing the entire multimedia content that may be redundant.

A description of an embodiment with several components in communication with each other does not imply that all such components are required. On the contrary a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a contextual summary of multimedia content. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 103 | One or more sources |
| 105 | Multimedia content database |
| 107 | Contextual summary generator |
| 109 | Processor |
| 111 | I/O interface |
| 113 | Memory |
| 203 | Data |
| 205 | Modules |
| 207 | Multimedia content data |
| 209 | Scene descriptors data |
| 211 | Speech descriptors data |
| 213 | Non-speech descriptors data |
| 215 | Textual descriptors data |
| 217 | Context descriptors data |
| 219 | Contextual summary data |
| 221 | Other data |
| 223 | Retrieving module |
| 224 | Scene descriptors module |
| 225 | Generating module |
| 231 | Identifying module |
| 233 | Converting module |
| 237 | Rank assigning module |
| 239 | Correlating module |
| 241 | Other modules |

What is claimed is:

1. A method of generating a contextual summary of multimedia content, the method comprising:
retrieving, by a contextual summary generator (107), the multimedia content comprising one or more scenes from a multimedia content database (105);
generating, by the contextual summary generator (107), one or more scene descriptors, describing a scene, for each of the one or more scenes;

identifying, by the contextual summary generator (107), an emotion factor in each of the one or more scenes based on each of the one or more scene descriptors, each of one or more speech descriptors and each of one or more textual descriptors associated with each of the one or more scenes;

generating, by the contextual summary generator (107), a context descriptor, indicating context of each of the one or more scenes, for each of the one or more scenes based on analysis of each emotion factor in each of the one or more scenes and non-speech descriptors associated with each of the one or more scenes; and correlating, by the contextual summary generator (107), the one or more scene descriptors, the one or more textual descriptors, and the context descriptors of the one or more scenes based on a dynamically configured threshold value to generate the contextual summary of the multimedia content.

2. The method as claimed in claim 1, wherein the one or more scene descriptors are generated by:
determining one or more key frames from each of the one or more scenes using one or more predefined techniques;
obtaining one or more non-redundant key frames from the one or more key frames based on distance between each of the one or more key frames; and
identifying in each of the one or more non-redundant key frames, one or more objects, one or more actions related to the objects and background where the one or more objects are present to generate one or more scene descriptors related to each of the one or more scenes.

3. The method as claimed in claim 1 further comprises assigning a rank to each of the one or more scenes based on each of the one or more scene descriptors, the context descriptors and the dynamically generated weightage corresponding to each of the one or more scenes.

4. The method as claimed in claim 3, wherein the dynamically generated weightage is computed based on frequency and duration of occurrence of one or more objects in each of the one or more scenes.

5. The method as claimed in claim 1, wherein the one or more scenes selected for correlating is based on a rank.

6. The method as claimed in claim 1, wherein the one or more speech descriptors comprise information related to at least one of pitch, tone or speed of speech audio signals present in each of the one or more scenes.

7. The method as claimed in claim 1, wherein the one or more textual descriptors are generated by converting speech audio signals in each of the one or more scenes into a text format.

8. The method as claimed in claim 1, wherein the contextual summary is in at least one of an audio format, a video format, an image format or a textual format.

9. The method as claimed in claim 1, wherein the context descriptor for each of the one or more scenes describes at least one of a formal context, an informal context, a humorous context, a serious context, a positive context or a negative context.

10. The method as claimed in claim 1, wherein the dynamically configured threshold is based on at least one of time for which the contextual summary of the multimedia content should be generated and information to be present in the contextual summary of the multimedia content, wherein the information indicates the one or more scene descriptors, the one or more speech descriptors, the one or more non-speech descriptors, the one or more textual descriptors and the one or more context descriptors.

11. A contextual summary generator (107) for generating a contextual summary of multimedia content, the contextual summary generator (107) comprising:
a processor (109); and
a memory (113) communicatively coupled to the processor (109), wherein the memory (113) stores the processor (109)-executable instructions, which, on execution, causes the processor (109) to:
retrieve the multimedia content comprising one or more scenes from a multimedia content database (105);
generate one or more scene descriptors, describing a scene, for each of the one or more scenes;
identify an emotion factor in each of the one or more scenes based on each of the one or more scene descriptors, each of one or more speech descriptors and each of one or more textual descriptors associated with each of the one or more scenes;
generate a context descriptor, indicating context of each of the one or more scenes, for each of the one or more scenes based on analysis of each emotion factor in each of the one or more scenes and non-speech descriptors associated with each of the one or more scenes; and
correlate the one or more scene descriptors, the one or more textual descriptors, and the context descriptors of the one or more scenes based on a dynamically configured threshold value to generate the contextual summary of the multimedia content.

12. The contextual summary generator (107) as claimed in claim 11, wherein to generate the one or more scene descriptors, the instructions cause the processor (109) to:
determine one or more key frames from each of the one or more scenes using one or more predefined techniques;
obtain one or more non-redundant key frames from the one or more key frames based on distance between each of the one or more key frames; and
identify in each of the one or more non-redundant key frames, one or more objects, one or more actions related to the objects and background where the one or more objects are present to generate one or more scene descriptors related to each of the one or more scenes.

13. The contextual summary generator (107) as claimed in claim 11, wherein the processor (109) is further configured to assign a rank to each of the one or more scenes based on each of the one or more scene descriptors, the context descriptors and the dynamically generated weightage corresponding to each of the one or more scenes.

14. The contextual summary generator (107) as claimed in claim 13, wherein the processor (109) computes the dynamically generated weightage based on frequency and duration of occurrence of one or more objects in each of the one or more scenes.

15. The contextual summary generator (107) as claimed in claim 11, wherein the processor (109) selects the one or more scenes for correlating based on a rank.

16. The contextual summary generator (107) as claimed in claim 11, wherein the one or more speech descriptors comprise information related to at least one of pitch, tone or speed of speech audio signals present in each of the one or more scenes.

17. The contextual summary generator (107) as claimed in claim 11, wherein the processor (109) generates the one or more textual descriptors by converting speech audio signals in each of the one or more scenes into a text format.

18. The contextual summary generator (107) as claimed in claim 11, wherein the context descriptor for each of the one or more scenes describes at least one of a formal context, an informal context, a humorous context, a serious context, a positive context or a negative context.

19. The contextual summary generator (107) as claimed in claim 11, wherein the dynamically configured threshold is based on at least one of time for which the contextual summary of the multimedia content should be generated and information to be present in the contextual summary of the multimedia content, wherein the information indicates the one or more scene descriptors, the one or more speech descriptors, the one or more non-speech descriptors, the one or more textual descriptors and the one or more context descriptors.

20. A non-transitory computer readable medium including instructions stored thereon that when processed by at least one processor (109) causes a contextual summary generator (107) to perform operations comprising:

retrieving the multimedia content comprising one or more scenes from a multimedia content database (105);

generating one or more scene descriptors, describing a scene, for each of the one or more scenes;

identifying an emotion factor in each of the one or more scenes based on each of the one or more scene descriptors, each of one or more speech descriptors and each of one or more textual descriptors associated with each of the one or more scenes;

generating a context descriptor, indicating context of each of the one or more scenes, for each of the one or more scenes based on analysis of each emotion factor in each of the one or more scenes and non-speech descriptors associated with each of the one or more scenes; and correlating the one or more scene descriptors, the one or more textual descriptors, and the context descriptors of the one or more scenes based on a dynamically configured threshold value to generate the contextual summary of the multimedia content.

\* \* \* \* \*